(12) United States Patent
Legrand

(10) Patent No.: US 7,607,233 B2
(45) Date of Patent: Oct. 27, 2009

(54) CUTTING WIRE FOR BRUSH CUTTERS AND EDGE TRIMMERS

(75) Inventor: Emmanuel Legrand, Villeneuve (FR)

(73) Assignee: Speed France (FR)

( * ) Notice: Subject to any disclaimer, the term of this patent is extended or adjusted under 35 U.S.C. 154(b) by 0 days.

(21) Appl. No.: 10/488,629

(22) PCT Filed: Sep. 3, 2001

(86) PCT No.: PCT/FR01/02730

§ 371 (c)(1),
(2), (4) Date: Sep. 27, 2004

(87) PCT Pub. No.: WO03/020008

PCT Pub. Date: Mar. 13, 2003

(65) Prior Publication Data

US 2005/0028390 A1    Feb. 10, 2005

(51) Int. Cl.
    *A01D 34/416* (2006.01)
(52) U.S. Cl. ............. 30/347; 30/276; 428/399; 428/400
(58) Field of Classification Search ............ 30/276, 30/347; 56/12.7, 295; 428/397, 399, 400, 428/398; D8/8
    See application file for complete search history.

(56) References Cited

U.S. PATENT DOCUMENTS

| | | | |
|---|---|---|---|
| 2,434,533 A | | 1/1948 | Wurzburger |
| 3,720,055 A | * | 3/1973 | de Mestral et al. ............ 57/248 |
| 4,054,993 A | | 10/1977 | Kamp et al. |
| 4,126,990 A | | 11/1978 | Fisher et al. |
| 4,186,239 A | | 1/1980 | Mize et al. |
| 4,367,587 A | | 1/1983 | Kilmer |
| D303,603 S | * | 9/1989 | Zimmerman ................ D7/650 |
| 4,869,055 A | * | 9/1989 | Mickelson ................ 56/12.7 |
| 4,905,465 A | | 3/1990 | Jones et al. |
| 5,220,774 A | | 6/1993 | Harbeke et al. |
| D358,535 S | | 5/1995 | Skinner |
| 5,430,943 A | * | 7/1995 | Lee .............................. 30/347 |
| D364,079 S | * | 11/1995 | Skinner ......................... D8/8 |
| 5,463,815 A | * | 11/1995 | Fogle .......................... 30/276 |

(Continued)

FOREIGN PATENT DOCUMENTS

DE           1704986          6/1971

(Continued)

OTHER PUBLICATIONS

Search Report for International Appl. No. PCT/FR01/02730 dated May 7, 2002.

(Continued)

*Primary Examiner*—Hwei-Siu C Payer
(74) *Attorney, Agent, or Firm*—Alston & Bird LLP

(57) ABSTRACT

The invention relates to a cutting wire (2) which is designed to trim or cut vegetation and which can be used on rotating head devices, such as brush cutters and edge trimmers. The external surface of the cutting wire is provided with tooth-type (5) or similar formations along the length of said wire (2). In the case of a wire having one or more longitudinal cutting edges (4), said tooth-type formations (5) are disposed on the cutting edge(s) along the length of each edge (4). In this way, the sharpness of the wire (2) is improved.

7 Claims, 3 Drawing Sheets

U.S. PATENT DOCUMENTS

| | | | |
|---|---|---|---|
| 5,524,350 A * | 6/1996 | Boland ................ 56/12.7 | |
| D376,078 S | 12/1996 | Skinner | |
| D376,739 S | 12/1996 | Skinner | |
| D379,052 S * | 5/1997 | Skinner ................ D8/8 | |
| 5,687,482 A | 11/1997 | Behrendt | |
| 5,709,942 A | 1/1998 | Leydon et al. | |
| 5,713,191 A | 2/1998 | Welton | |
| 5,761,816 A | 6/1998 | Morabit et al. | |
| 5,896,666 A | 4/1999 | Iacona et al. | |
| 5,987,756 A | 11/1999 | Yates et al. | |
| 5,996,233 A | 12/1999 | Morabit et al. | |
| 6,018,840 A * | 2/2000 | Guay et al. ............ 15/207.2 | |
| 6,045,911 A | 4/2000 | Legrand et al. | |
| 6,061,914 A | 5/2000 | Legrand | |
| 6,094,823 A | 8/2000 | Brown et al. | |
| 6,108,914 A | 8/2000 | Sheldon | |
| 6,119,350 A | 9/2000 | Sutliff et al. | |
| 6,124,034 A | 9/2000 | Proulx et al. | |
| RE36,940 E * | 11/2000 | Fogle ................ 30/276 | |
| 6,161,292 A | 12/2000 | Morabit et al. | |
| 6,171,697 B1 | 1/2001 | Legrand | |
| 6,240,643 B1 | 6/2001 | Civalleri | |
| 6,314,848 B2 | 11/2001 | Morabit et al. | |
| 6,347,455 B2 | 2/2002 | Brant et al. | |
| 6,560,878 B2 | 5/2003 | Skinner et al. | |
| 6,601,373 B1 | 8/2003 | Legrand | |
| 6,630,226 B1 | 10/2003 | Legrand | |
| 6,874,235 B1 | 4/2005 | Legrand | |
| 6,910,277 B2 | 6/2005 | Proulx et al. | |
| 7,000,324 B2 | 2/2006 | Fogle | |
| 7,210,231 B2 * | 5/2007 | Legrand ................ 30/276 | |
| 7,257,898 B2 | 8/2007 | Iacona | |
| 2002/0023356 A1 | 2/2002 | Skinner et al. | |
| 2005/0081389 A1 * | 4/2005 | Legrand ................ 30/276 | |
| 2005/0172501 A1 * | 8/2005 | Fogle ................ 30/347 | |
| 2005/0188547 A1 * | 9/2005 | Legrand ................ 30/347 | |
| 2005/0229402 A1 * | 10/2005 | Iacona ................ 30/276 | |

FOREIGN PATENT DOCUMENTS

| | | |
|---|---|---|
| DE | 4321650 | 10/1994 |
| DE | 196 32 721 | 2/1998 |
| DE | 19817883 | 11/1999 |
| EP | 0867108 | 9/1998 |
| EP | 1057396 | 12/2000 |
| EP | 1129609 | 9/2001 |
| JP | 63059812 | 3/1988 |
| JP | 7184446 | 7/1995 |
| WO | WO 97/19584 | 6/1997 |
| WO | WO 97/43469 | 11/1997 |
| WO | WO 99/40773 | 8/1999 |

OTHER PUBLICATIONS

International Preliminary Examination Report for International Application No. PCT/FR01/02730 completed Dec. 17, 2003.

* cited by examiner

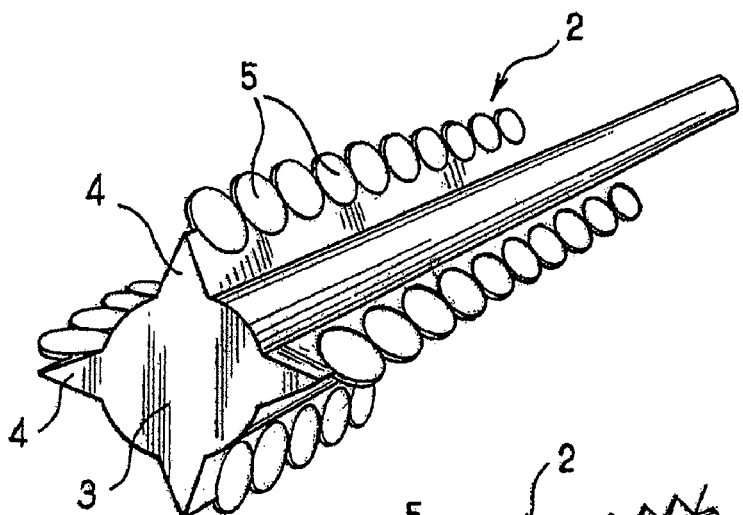
FIG_2
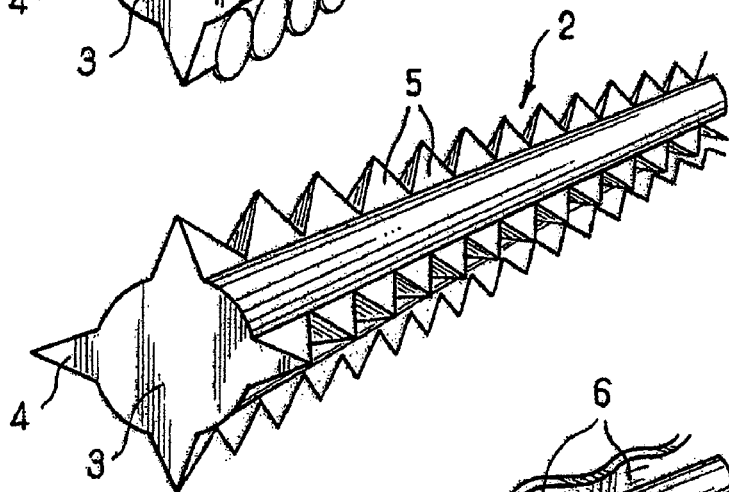
FIG_3
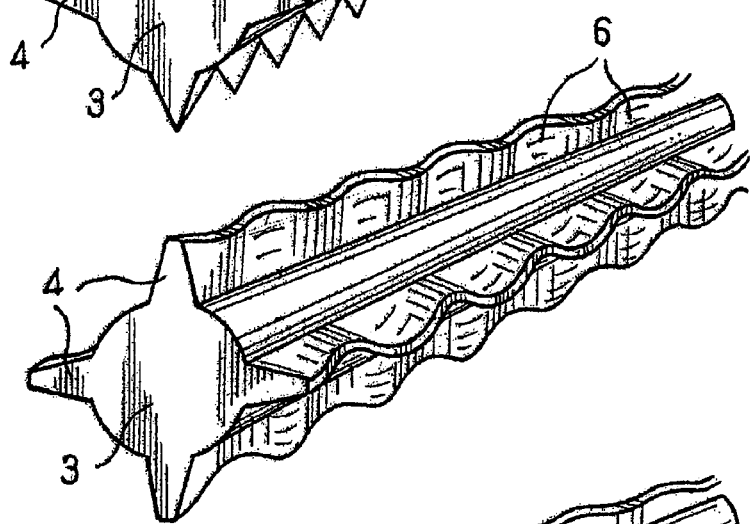
FIG_4
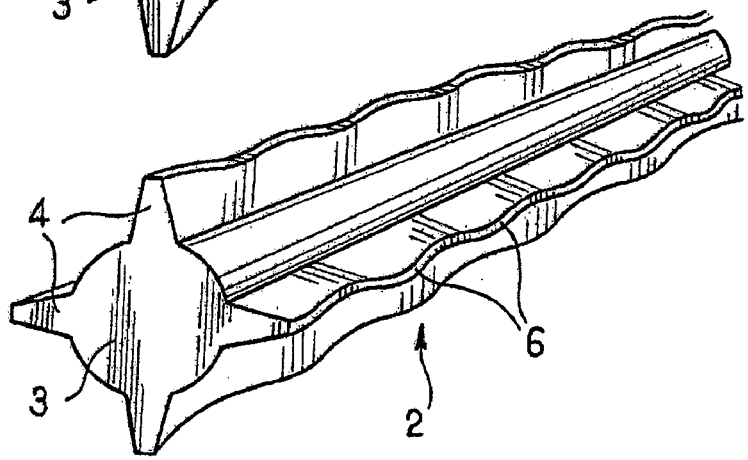
FIG_5

CUTTING WIRE FOR BRUSH CUTTERS AND EDGE TRIMMERS

This application claims the benefit of the filing date of PCT/FR01/02730, filed Sep. 3, 2001, the disclosure of which is hereby incorporated herein by reference.

This invention relates to cutting wires designed for pruning and cutting vegetation (bush or grass) that can be used on mechanised farming equipment with rotary heads, commonly called brush cutters and edge trimmers.

This type of mechanised farming equipment is usually equipped with a thermal combustion engine or an electric motor that rotates a rotating head on which one or more cutting wires are fixed at a high speed of between about 3000 and 12000 rpm. During this fast rotation of the head, the cutting wire or wires move radially outwards under the effect of the centrifugal force, thus covering a circular area inside which they exercise a cutting effect on the vegetation that they encounter.

The cutting wires, currently made and marketed specifically for this use, are single fibres smooth on the outside, usually made of synthetic materials such as polyamide, with a circular section in the simplest case.

Various development efforts have been made on the following aspects, to improve the characteristics, performances and other qualities of such cutting wires:

a) Production of cutting wires with a particular section: apart from the traditional round section, cutting wires with a square section, a polygonal section (for example pentagonal section), star-shaped and toothed wires, etc. have been proposed in the past.

b) Search for cutting wires that operate more quietly, for example due to conformation or a surface appearance designed for this purpose.

c) Proposals for cutting wires characterized by their composition: production of cutting wires made of a particular material, or cutting wires characterized by a particular combination of materials (for example forming the core and the "skin" of the wire), or cutting wires characterized by insertion of particular fillers into their basic material, such as abrasive fillers.

However, there is still room for improvements to cutting wires, despite improvements already achieved as a result of various research that has been done. In particular, efforts made in the past to improve the cutting capacity of these wires, which is obviously the most important required quality, are still inadequate.

The purpose of this invention is therefore to improve cutting wires for brush cutters and edge trimmers, particularly in terms of their cutting capacity, using a technically simple, efficient and economic solution compatible with various wire shapes and materials.

The main purpose of the invention is therefore a cutting wire for brush cutters and edge trimmers, characterized in that its external appearance is in the form of a sequence of toothed or similar formations, along the length of this cutting wire.

In one embodiment of the invention, the cutting wire has at least one cutting edge extending along the longitudinal direction of this cutting wire, and the toothed or similar formations are made on at least one longitudinal cutting edge of the wire, these toothed or similar formations being arranged one after the other along the length of this cutting edge.

Thus, the invention proposes a cutting wire that is not characterized by a particular section or by a specific composition, but that comprises a sequence of toothed or similar formations, such that it has a toothed longitudinal profile over its entire length. In particular, one or more longitudinal cutting edges on this wire may form the "support" for the said toothed or similar formations, but it is also possible to make such sequences of teeth on the surface of the cutting wire remote from the edges of this wire, or even on the surface of a cutting wire without any longitudinal edges, such as a round wire.

Thus in all cases, the cutting capacity of the wire is improved, in other words it cuts the vegetation more easily, both grass and bush.

Furthermore, the wire according to the invention results in a cleaner cut of the vegetation, and this is an additional advantage. With a traditional round or square cutting wire, the stems of cut grass are damaged at their ends causing fast yellowing under the effect of the sun. On the other hand, the very sharp cutting wire according to the invention cuts much more cleanly, thus reducing the yellowing effect, as demonstrated in tests carried out by the Applicant.

Since the cutting wire has several cutting edges extending in the longitudinal direction of this wire, all cutting edges can have toothed or similar formations in sequence along the length of these cutting edges.

According to another possibility, also applicable in the case in which the cutting wire has several cutting edges, only some of these cutting edges have toothed or similar formations in sequence along the length of these cutting edges, while the appearance of the other edges remains smooth.

If the cutting wire has at least two cutting edges with toothed or similar formations in sequence along the length of these cutting edges, it is also possible:
  for these toothed or similar formations to be identical on all cutting edges concerned, and located in corresponding positions on each cutting edge,
  or for these toothed or similar formations to be identical on all cutting edges concerned, but at different longitudinal positions on each cutting edge,
  or for these toothed or similar formations to be different on each cutting edge.

Various configurations of the particular appearance of the said toothed or similar formations provided on or away from the cutting edges of the cutting wire, could be envisaged. Thus, the formations in question may have the following appearance:
  teeth with the same shape and height, such that each cutting edge concerned is in the form of a "saw tooth",
  or teeth with irregular shapes and/or heights, but that can be repeated at a predefined "pitch", particularly along the length of the cutting edge concerned,
  or teeth with a convex or concave rounded profile,
  or formations such as square notches, V-notches or slits, succeeding each other at intervals particularly along the length of each cutting edge concerned,
  or more or less accentuated undulations, provided along each cutting edge concerned.

In any case, the invention will be better understood from the following description with reference to the appended diagram, representing examples of some embodiments of this cutting wire for brush cutters and edge trimmers:

FIGS. 2 to 5 are perspective views similar to FIG. 1, showing segments of other cutting wires in conformance with this invention;

Figure 1:
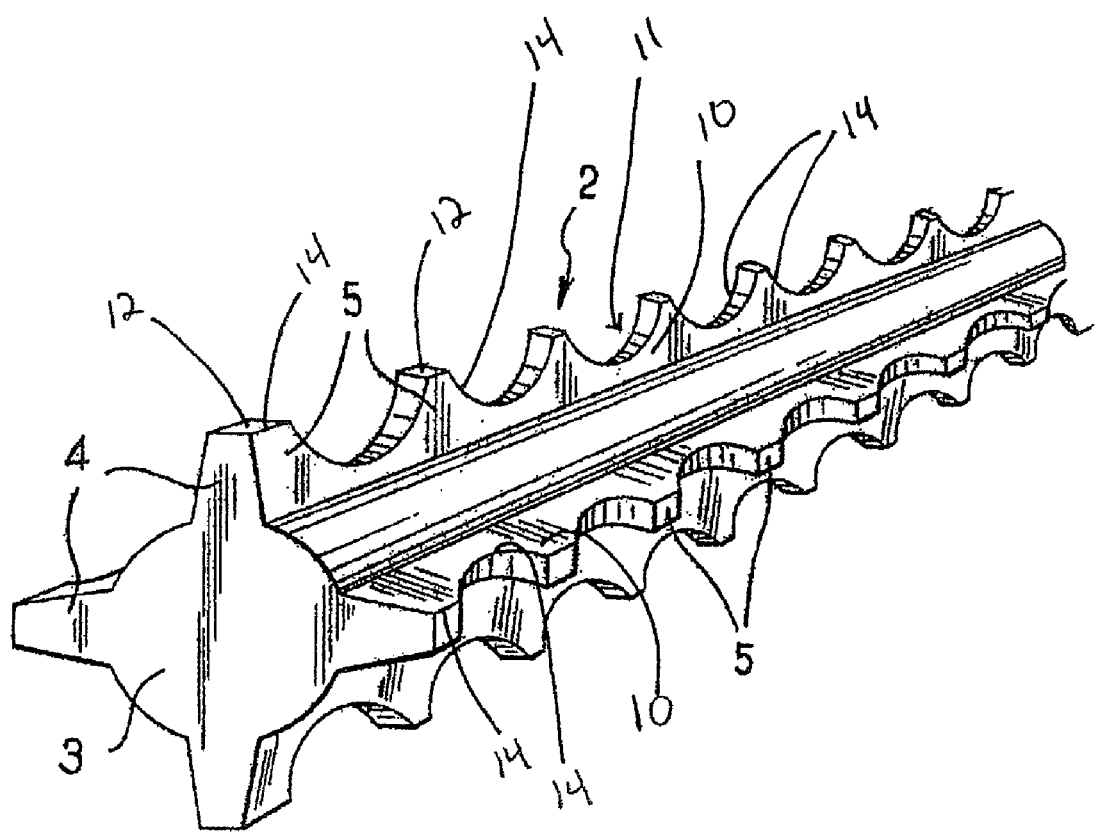
FIG. 1 is a perspective view of a segment of a cutting wire in conformance with this invention.

FIG. 1 shows a large-scale view of a segment of a cutting wire 2 for brush cutters and edge trimmers, showing the section through this wire. In this case the cutting wire 2 is in the shape of a star section with a central body 3 with a round section, and four longitudinal cutting edges 4 arranged crosswise in the external part or periphery of the wire 2.

In this case, teeth 5 with regular heights and shapes and with a rounded concave profile 11 and substantially flat lands 12 are formed on each longitudinal cutting edge 4 of the wire 2, one after the other along the length of the cutting edge 4. The teeth 5 thus formed on each cutting edge 4 may be located so as to correspond with the identical teeth 5 formed on the other cutting edges 4. In general, the cutting wire 2 has a high cutting capacity and all its cutting edges 4 will be in the form of a "saw tooth."

As shown in FIG. 1, at least one cutting edge 4 may have substantially flat faces 10. The flat lands 12 and the concave rounded profiles 11 may intersect the substantially flat faces 10 so as to form sharp angles 14.

FIG. 2 shows the corresponding elements denoted with the same numerical reference marks, showing a variant of this cutting wire 2. In this case, the teeth 5 formed on the longitudinal cutting edges 4 have a regular shape and height, but they have a convex rounded profile resembling small circular disks one after the other along the length of each cutting edge 4.

FIG. 3 shows another embodiment of a cutting wire 2 according to the invention. In this case this wire 2 still has the same basic shape, teeth 5 with a regular shape and height, and a triangular shape, formed on the longitudinal cutting edges 4.

FIG. 4 shows another embodiment of the cutting wire 2 according to the invention. This wire 2 still has the same basic shape, the longitudinal cutting edges 4 in this case being provided with undulations 6 that repeat themselves along the direction of the length of the said cutting edges 4. The undulations 6 are relatively accentuated in the example in FIG. 4.

One variant of this last cutting wire 2 is illustrated in FIG. 5. In this case, the undulations 6 on the longitudinal cutting edges 4 are less accentuated, and are continuously repeated along the direction of the length of these cutting edges 4.

Figure 6:
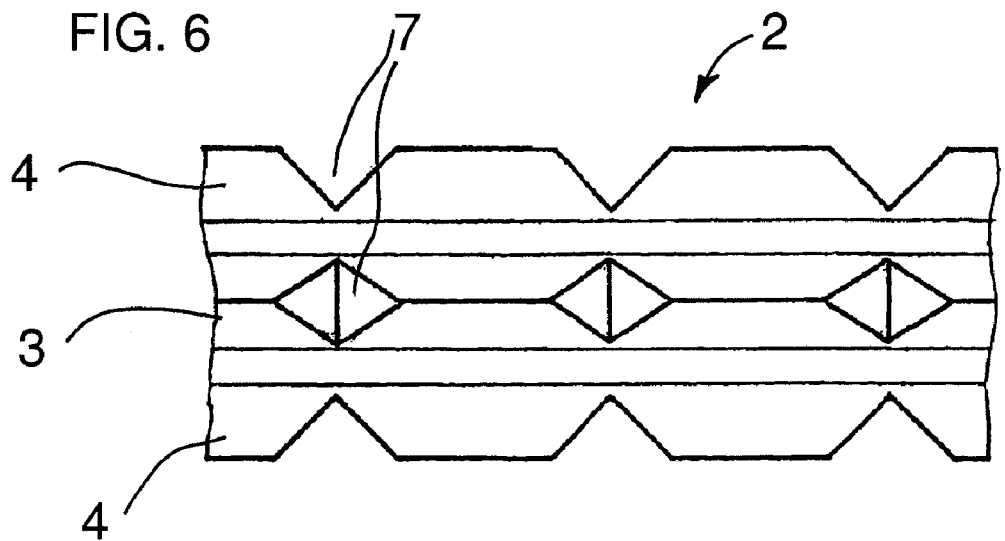
FIG. 6 shows a side view of another segment of a cutting wire according to the invention.

FIG. 6 shows a particular embodiment of the cutting wire 2, with the same basic shape. In this case, the teeth provided to improve the cutting capacity of the wire 2 are formed by creating V-notches or slits 7, one after the other at regular intervals along each longitudinal cutting edge 4.

Figure 7:
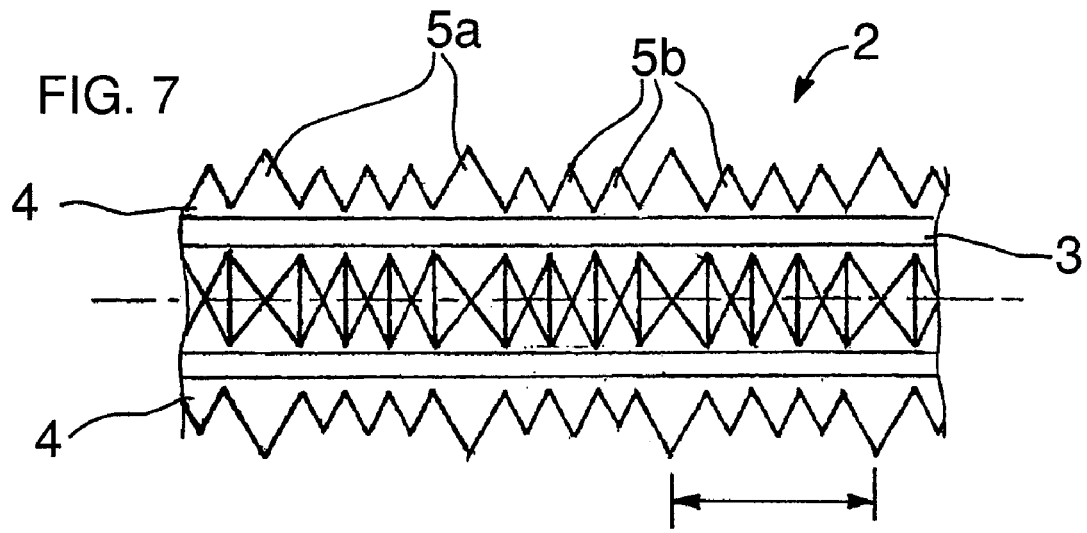
FIGS. 7 and 8 are partial side views of cutting wires according to the invention with teeth with particular profiles.

As illustrated in FIG. 7, the toothed formations made on the longitudinal cutting edges 4 of the cutting wire 2, may be provided with higher teeth 5a, between which other smaller teeth 5b are formed, all the teeth 5a and 5b having a triangular shape, and the pattern formed by these teeth 5a and 5b being repeated at a pitch P along the length of each cutting edge 4.

Figure 8:
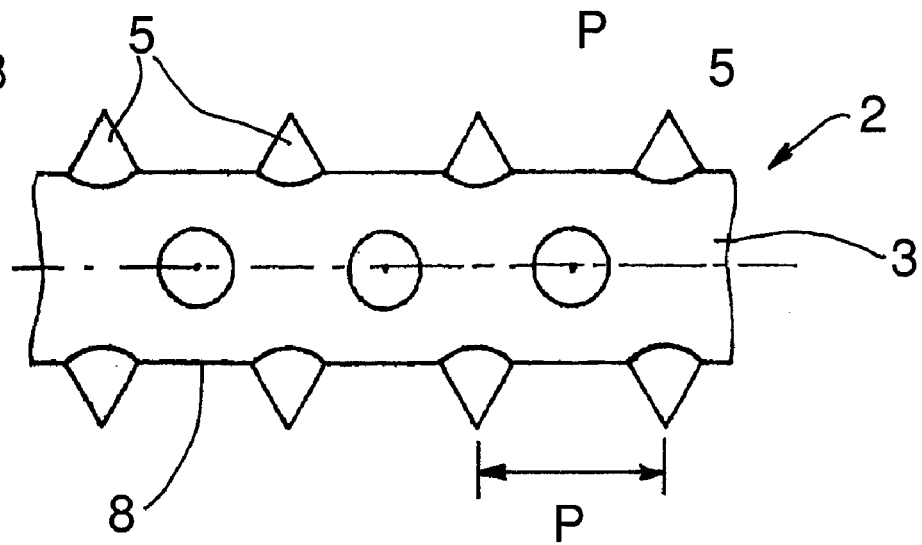

Finally, as shown in FIG. 8, the teeth 5 may succeed each other at a predetermined pitch P along the longitudinal direction of the cutting wire 2, separated from each other by smooth intervals 8 in which there are no teeth. This embodiment is particularly applicable to teeth 5 formed away from cutting edges, directly on the outside surface of the cutting wire 2, rather than on the longitudinal cutting edges of this wire 2.

The following are all within the scope of the invention:
the cutting wire can be made with any section and with any dimensions,
this cutting wire can be made from any single or composite material;
the number of cutting edges provided with toothed or similar formations can be varied;
the toothed or similar formations can be remote from any cutting edges, on the outside surface of the cutting wire;
these toothed or similar formations can be made with different shape details;
the said toothed or similar formations can be made using any appropriate process.

The invention claimed is:

1. A cutting wire adapted for use on brush cutters and edge trimmers, comprising:
   a central body with a round section,
   at least one longitudinal cutting edge arranged on the external part or periphery of the wire, wherein said at least one cutting edge has substantially flat faces, and
   teeth integrally formed on said cutting edge,
   wherein each tooth consists of a portion of the cutting edge located between two successive concave rounded profiles, wherein said concave rounded profiles intersect said flat faces so as to form sharp angles,
   said teeth being substantially shorter than the rounded profiles in a longitudinal direction of the cutting wire,
   and wherein a thickness at the bottom of the concave rounded profiles in a direction perpendicular to the longitudinal direction is greater than a thickness of the teeth at a free end thereof in said direction perpendicular to the longitudinal direction.

2. A cutting wire adapted for use on brush cutters and edge trimmers, comprising:
   a central body with a round section,
   at least one longitudinal cutting edge arranged on the external part or periphery of the wire, wherein said at least one cutting edge has substantially flat faces, and
   teeth integrally formed on said cutting edge,
   wherein each tooth consists of a portion of the cutting edge located between two successive concave rounded profiles so as to space said two successive concave rounded profiles apart in a longitudinal direction of the cutting wire, wherein said concave rounded profiles intersect said flat faces so as to form sharp angles,
   said teeth being substantially shorter than the rounded profiles in the longitudinal direction of the cutting wire.

3. A cutting wire adapted for use on brush cutters and edge trimmers, comprising:
   a central body with a round section,
   at least one longitudinal cutting edge arranged in the external part or periphery of the wire, and
   teeth integrally formed on the at least one cutting edge and consisting of successive substantially flat lands separated by concave rounded profiles,
   wherein said at least one cutting edge has substantially flat faces and wherein the flat lands and the concave rounded profiles intersect said flat faces so as to form sharp angles.

4. The cutting wire according to claim 3, comprising four longitudinal cutting edges arranged crosswise in the external part or periphery of the wire.

5. The cutting wire according to claim 4, wherein teeth formed on each cutting edge are located at different longitudinal positions on each cutting edge.

6. The cutting wire according to claim 4, wherein teeth formed on each cutting edge are located in corresponding longitudinal positions on each cutting edge.

7. The cutting wire according to claim 3, wherein the substantially flat lands are shorter than the rounded profiles in a longitudinal direction of the cutting wire.

* * * * *